(12) United States Patent
Bader

(10) Patent No.: US 10,934,198 B1
(45) Date of Patent: Mar. 2, 2021

(54) RELATIVE NON-WETTABILITY OF A PURIFICATION MEMBRANE

(71) Applicant: Mansour S. Bader, College Station, TX (US)

(72) Inventor: Mansour S. Bader, College Station, TX (US)

(*) Notice: Subject to any disclaimer, the term of this patent is extended or adjusted under 35 U.S.C. 154(b) by 0 days.

(21) Appl. No.: 16/873,135

(22) Filed: Feb. 8, 2020

Related U.S. Application Data

(63) Continuation-in-part of application No. 16/501,510, filed on Apr. 20, 2019, now Pat. No. 10,577,269, which is a continuation-in-part of application No. 15/731,999, filed on Sep. 7, 2017, now Pat. No. 10,322,952, which is a continuation-in-part of application No. 15/731,626, filed on Jul. 10, 2017, now Pat. No. 10,336,638, which is a continuation of application No. 13/999,309, filed on Feb. 8, 2014, now Pat. No. 9,701,558.

(51) Int. Cl.
| | | |
|---|---|---|
| *B01D 15/00* | (2006.01) | |
| *C02F 9/00* | (2006.01) | |
| *C02F 1/00* | (2006.01) | |
| *C02F 1/20* | (2006.01) | |
| *C02F 1/52* | (2006.01) | |
| *C02F 1/54* | (2006.01) | |
| *C02F 1/44* | (2006.01) | |
| *C02F 1/72* | (2006.01) | |
| *C02F 103/18* | (2006.01) | |

(52) U.S. Cl.
CPC ............ *C02F 9/00* (2013.01); *C02F 1/004* (2013.01); *B01D 15/00* (2013.01); *C02F 1/20* (2013.01); *C02F 1/441* (2013.01); *C02F 1/442* (2013.01); *C02F 1/444* (2013.01); *C02F 1/5236* (2013.01); *C02F 1/54* (2013.01); *C02F 1/72* (2013.01); *C02F 2103/18* (2013.01); *C02F 2303/20* (2013.01); *C02F 2303/22* (2013.01)

(58) Field of Classification Search
USPC ........................................................ 210/638
See application file for complete search history.

(56) References Cited

U.S. PATENT DOCUMENTS

| | | | | |
|---|---|---|---|---|
| 2,789,063 A | | 4/1957 | Purvis | |
| 5,028,337 A | * | 7/1991 | Linder | B01D 69/125 210/642 |
| 6,406,517 B1 | * | 6/2002 | Avery | B01D 53/228 55/524 |
| 6,540,813 B2 | * | 4/2003 | Nelson | B01D 53/228 55/524 |
| 6,844,030 B2 | * | 1/2005 | Jing | C08J 5/124 427/508 |

(Continued)

OTHER PUBLICATIONS

U.S. Appl. No. 16/501,510, filed Apr. 16, 2019, Bader.

(Continued)

*Primary Examiner* — Nina Bhat

(57) ABSTRACT

Methods are herein provided for preparing a material for casting a flat-sheet, extruding a solid-fiber, and/or extruding a hollow-fiber utilizing a chlorinated aqueous amine solution as an effective solvent to form a crystalline polymorph structure of the material. This material in the form of, for example, an effective vapor permeable membrane can be used in membrane distillation to desalinate saline streams.

19 Claims, 10 Drawing Sheets

(56) References Cited

U.S. PATENT DOCUMENTS

| | | | |
|---|---|---|---|
| 7,569,275 B2 * | 8/2009 | Fukushi | B32B 1/08 |
| | | | 138/141 |
| 8,915,301 B1 | 12/2014 | Bader | |
| 9,701,558 B1 | 7/2017 | Bader | |
| 10,258,920 B1 | 4/2019 | Bader | |
| 10,259,734 B1 | 4/2019 | Bader | |
| 10,259,735 B1 | 4/2019 | Bader | |
| 10,280,103 B1 | 5/2019 | Bader | |
| 10,322,952 B1 | 6/2019 | Bader | |
| 10,336,638 B1 | 7/2019 | Bader | |
| 10,441,898 B1 | 10/2019 | Bader | |
| 2007/0256969 A1 * | 11/2007 | Ding | B01D 69/12 |
| | | | 210/490 |
| 2008/0296225 A1 * | 12/2008 | Ho | B01D 67/0006 |
| | | | 210/640 |
| 2015/0321151 A1 * | 11/2015 | Lee | B01D 71/56 |
| | | | 210/500.38 |

OTHER PUBLICATIONS

U.S. Appl. No. 16/501,595, filed May 6, 2019, Bader.

Bader, M.S.; Precipitation and Separation of Chloride and Sulfate Ions from Aqueous Solutions: Basic Experimental Performance and Modeling; Environ. Progr., 1998, 17, 126-135.

Bader, M.S.; Thermodynamics of Ions Precipitation in Mixed-Solvent Mixtures; J. Hazard. Mater., 1999, B69, 319-334.

Ferry, D.; Ultrafilter membranes and ultrafiltration; Chemical Reviews, 1936, 8, 373-455.

Hsu, C.C. and Prausnitz, J.M.; Thermodynamics of Polymer Compatibility in Ternary Systems; Macromolecules; 1974, 7, 320-324.

Madorsky, S.L.; Fluorocarbon and chiorocarbon polymers, in: Thermal degradation of organic polymers, John Wiley & Sons Inc., 1964, pp. 130-172.

* cited by examiner

RELATIVE NON-WETTABILITY OF A PURIFICATION MEMBRANE

RELATED APPLICATIONS

This application is a continuation-in-part of my allowed patent application Ser. No. 16/501,510 filed on Apr. 16, 2019; which is a continuation-in-part of my patent application Ser. No. 15/731,999 filed on Sep. 7, 2017, now U.S. Pat. No. 10,322,952; which is a continuation-in-part of my patent application Ser. No. 15/731,626 filed on Jul. 10, 2017, now U.S. Pat. No. 10,336,638; which is a continuation-in-part of my patent application Ser. No. 13/999,309 filed on Feb. 8, 2014, now U.S. Pat. No. 9,701,558.

This application is also related to my allowed patent application Ser. No. 16/501,595 filed on May 6, 2019; which is a continuation-in-part of my patent application Ser. No. 14/998,774 filed on Feb. 13, 2016, now U.S. Pat. No. 10,280,103; which is a continuation-in-part of my patent application Ser. No. 14/544,436 filed on Jan. 6, 2015, now U.S. Pat. No. 10,259,735; which is a continuation-in-part of my patent application Ser. No. 14/544,317 filed on Dec. 22, 2014, now U.S. Pat. No. 10,259,734; which is a continuation-in-part of my patent application Ser. No. 13/066,841 filed on Apr. 26, 2011, now U.S. Pat. No. 8,915,301.

BACKGROUND OF THE INVENTION

Water is the origin of every living thing. Yet the function of water—as a lubricant or a solvent, a displacing fluid or a displaced fluid, a wetting fluid or a non-wetted fluid, to name a few—firmly lies at the heart of physical situations that vary from geology (e.g., altering miscibility and interfacial forces), through biology (e.g., de-toxifying wastewater and derivative streams of wastewater), to oceanology (e.g., inverting the salinity of seawater to produce potable water and brine).

In saline water desalination, membrane distillation (MD) offers an elegant alternative concept to conventional methods [e.g., multi-stage flash (MSF) desalination, multi-effect (ME) distillation, and reverse osmosis (RO)], as energy efficient especially when combined with low grade or waste energy sources. MD has an essential simplicity of structure in that it consists inherently only of a compact housing envelop and a type of a low pressure separating surface performing only one function between two fluids at relatively moderate temperatures (e.g., <90° C.). However, vapor permeability through MD membranes is low; thereby enhancing it is of vital interest.

THE OBJECTIVES OF THE INVENTION

The main objective of this invention is to provide membranes that can be extremely water non-wet and extremely permeable to wetting fluids including vapor.

BRIEF SUMMARY OF THE INVENTION

The present invention generally provides methods for preparing a material for casting a flat-sheet, extruding a solid-fiber, and/or extruding a hollow-fiber utilizing a chlorinated aqueous amine solution as an effective solvent for phase inverting the material to form a crystalline polymorph structure.

The inventive materials are not restricted to use in connection with one particular application. They can be used, in general, to separate water vapor from saline water in MD, to separate gases and hydrophobic constituents from wastewater, to separate gases and/or oil from wet oil. Further objects, novel features, and advantages of the subject invention will be apparent to those skilled in the art upon examining the accompanying drawings and upon reading the following description of the preferred embodiments, or may be learned by practice of the invention. Those of ordinary skills in the art will appreciate that the subject invention can be modified or adapted in a variety of ways. All such modifications or adaptions, which fall within the scope of the appended claims, are intended to be covered.

DESCRIPTION OF THE PREFERRED EMBODIMENT

The Relative Non-Wettability

Figure 1:
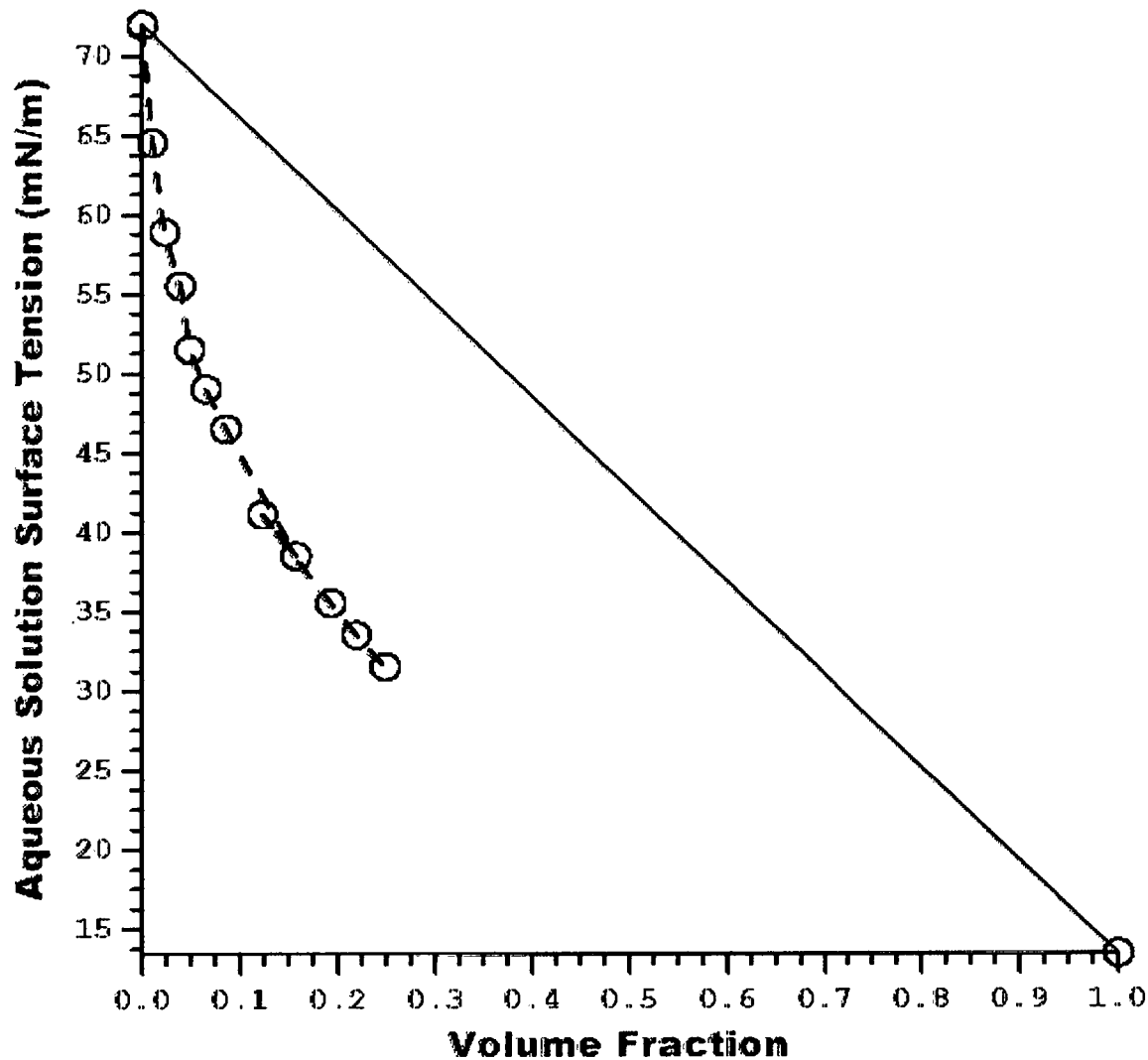
FIG. 1 illustrates surface tensions of the aqueous amine (TMA) solution.

Phase inversion has been appeared in a multitude of forms, but all have been characterized by specific controls of composition (e.g., solubility, pH, etc.), temperature, pressure, and/or combinations thereof. Phase inversion is also used as an enabling step in the work-up or break-up of a reaction or an interaction, before final displacement of a phase, before final casting or extruding of a phase, or before final separation/purification of a phase or a product by distillation, filtration, sublimation, precipitation, crystallization, adsorption, absorption, among others.

Precipitation, for example, involves phase inversion, wherein a soluble species in a primary solvent is transformed into an insoluble state either by decreasing its solubility in the primary solvent or by extracting the primary solvent from the soluble species. One form is selective precipitation, which stands on inducing a secondary solvent to a solution to reduce the solubility of the species by binding the primary solvent to the secondary solvent. Of course, the identity of the primary solvent, the nature and concentration of the soluble species and the conditions under which phase inversion is conducted come into play, but the effectiveness resides with the identity and modification of the secondary solvent.

The induction of an amine solvent [e.g., methylamine (ME), ethylamine (EA), isopropylamine (IPA), propylamine (PA), dimethylamine (DMA), diethylamine (DEA), diisopropylamine (DTA) and dipropylamine (DPA)] has been innovatively used by the inventor as a secondary solvent in a liquid phase precipitation as well as a vapor (compressed and/or flashed) phase precipitation with multiple variants to effectively selectively precipitate targeted: (1) inorganic species; and/or (2) ionizable organics (e.g., carboxylic salts, phenol salts, etc.) and inorganics (e.g., carbonates, sulfides, etc.) from aqueous streams. The yields of these precipitation variants are remarkable particularly, for example, in: (1) de-scaling saline streams; (2) aiding the de-oiling of saline streams; (3) de-mixing the amphiphilic portion of wet oil; and (4) de-folding the amphiphilic nature of proteins in wastewater to ultimately separate endotoxins with dense gas (e.g., carbon dioxide).

The key factors in these selective precipitation variants are that the amine solvent (the secondary solvent) is miscible with water (the primary solvent), whereas: (1) the solubility of the targeted inorganic species is very limited in the amine solvent; and/or (2) the ionizablity of targeted organic and inorganic species in the presence of the amine solvent becomes crossover (below or above) the neutral pH. The latter has been further modified by, for example, transforming the amine solvent into an anionated form by reacting it with acid, since these amine solvents are weak bases that undergo reversible reactions with water or acid to form weak acids, and then regenerating the amine solvent (a weak base) from its anionated form by an external hydroxide source (an inorganic or organic). The external hydroxide source serves, in turn, a multitude of purposes including restoring the amine solvent to its weak basic form to serve a further purpose, facilitating the recovery of the amine solvent for reuse, and using the external hydroxide source, itself, in a further step (e.g., de-scaling). This pH switchability of the amine solvent displaces selectively the ionization equilibrium of reactive species towards either their molecular forms or ionized states. It displaces the ionization equilibrium of, for example, carboxylic acids and phenols in wet oil towards their molecular forms under an acidic condition, which are essentially hydrophobic instead of their amphiphilic ionized states under slightly basic conditions. The opposite goes for naturally occurring basic constituents in wet oil. The pH switchability thus leads to two low values of wet oil interfacial tension; one at either end of the pH scale.

As such, the inventor has innovatively exploited the competition between targeted inorganic species and/or ionizable species and amine molecules on the water molecules by: (1) the "amining out" step wherein targeted inorganic species are precipitated whereas the amine solvent remains in solution; (2) "salting out" step wherein an amine solvent is separated while inorganic species remains in the solution; (3) the "ionizing out" step wherein acidic and basic ionizable organic and inorganic species and proteins are reversibly selectively displaced by dissolving them, precipitating them, isolating them, and/or converting them to a gaseous state whereas the amine solvent remains in solution; (4) the "wetting out" step wherein a membrane's pores are selectively filled with a liquid phase or fluid; and/or (5) the standalone, sequential or simultaneous occurrence of such described steps. The fundamental thermodynamic frameworks for the precipitation of ionic species in mixed solvents have also been established [Bader; 1998 and 1999].

Phase inversion by inducing a secondary solvent has also long been used, among other concepts (e.g., melting, sintering, etching, stretching, surface coating, surface grafting, etc.), to prepare membranes. In a conventional polymer phase inversion process comprising three components, a polymer is dissolved in a primary solvent to form a homogenous solution. The polymer is then precipitated from the homogenous solution by a secondary solvent, wherein the secondary solvent is soluble in the primary solvent while the polymer is nearly insoluble in the secondary solvent. During phase de-mixing, the solution is cast (e.g., flat-sheet) or extruded (e.g., hollow-fiber, tubular, etc.) into a desired shape, wherein the polymer-rich phase solidifies into a membrane matrix whereas the polymer-poor phase develops into pores within the membrane. The thermodynamic principle for the precipitation of polymeric species in mixed solvents has been delineated [e.g., Hsu and Prausnitz, 1974]. In different variants of inducing a secondary solvent, polymer phase inversion by precipitation has been used to prepare membranes. The basic principles of these variants are briefly summarized in the following paragraph [e.g., Ferry, 1936].

A membrane film was historically practically prepared by subjecting a polymer dissolved in a primary solvent to vapor of a secondary solvent to prevent the evaporation of the primary solvent from the formed film but allow the vapor of the secondary solvent to diffuse into the formed film, thereby forming a porous membrane without a top layer. Here, the secondary solvent is more volatile than the primary solvent. In another variant, a polymer is dissolved in mixed primary and secondary solvents, wherein the primary solvent is more volatile than the secondary solvent, whereby increasing the content of the polymer and secondary solvent by evaporating the primary solvent, which eventually leads to polymer precipitation resulting in forming a skinned membrane. In a further variant, a polymer is dissolved in a primary solvent, and the homogenous solution is cast on a substrate by dip coating or spraying, followed by allowing the primary solvent to evaporate in an inert atmosphere (e.g., nitrogen or air) to expel the vapor of the primary solvent, thereby forming a dense homogenous membrane. Phase inversion by these evaporative precipitation variants has been further adapted to prepare membranes by liquid-phase precipitation, wherein a homogenous solution comprising a polymer and a primary solvent is directly immersed in a bath containing a secondary solvent [e.g., Loeb and Sourirajan, 1963]. The latter made the practical use of reverse osmosis (RO) hydrophilic membranes to desalinate seawater possible, which was a landmark contribution of United States to the desalination field. Membrane fabrications since then remain essentially extensions of such methods; all which involve melting or dissolving a polymer, casting or extruding the melted or dissolved polymer, and precipitating the polymer by phase inversion; but again the effectiveness resides with the identity and modification of the secondary solvent.

Precedent surface modification methods for polytetrafluoroethylene (PTFE) to make it bondable to other materials by reacting the surface with suitable fluid cation/metal reactants before bonding were developed in the 1950s [U.S. Pat. No. 2,789,063]. The methods were based on replacing fluorine in the surface layer of PTFE with the cation or metal, thereby making the surface more hydrophilic. Alkali cations (e.g., sodium), alkaline earth cations (e.g., calcium), and transition metals (e.g., manganese or zinc) were used to react with PTFE surfaces at high temperatures [e.g., above the melting point of the cation or metal, but below the melting point of PTFE (315° C.)] or heating the PTFE material as it emerged from a liquid reacting bath at high temperatures (e.g., 220° C.); wherein the cation or metal is a vapor, a cation or metal hydride, or in non-aqueous liquid ammonia or methylamine. It should also be noted that, as all hydroflurocarbon polymers, pyrolysis at high temperatures also degrades PVDF by the evolution of a large amount of hydrogen fluoride (HF). This large loss of HF, de-hydrofluorination, is due to the equal distribution of repeated hydrogen-fluoride chains in PVDF. De-hydrofluorination may be followed by the formation of double bonds (chain scission, thereby more thermal stability), and/or may result in cross-linking of the polymer (fusing, thereby highly orientated fibrils and better mechanical strength). The de-hydrofluorination mechanisms of PVDF by pyrolysis may be expressed as follows [Madorsky, 1964].

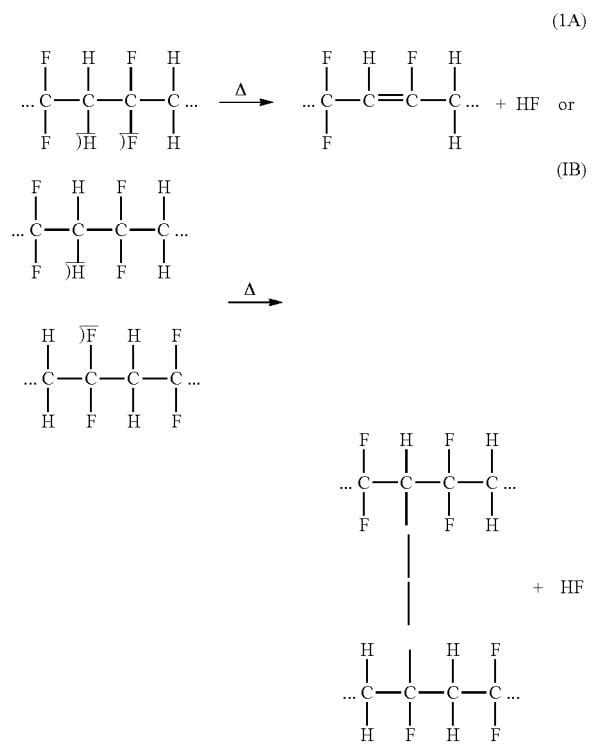

Chemically, rather than thermally, cross-linking modifications of PVDF and/or equivalent materials to produce highly orientated interlinked semi-crystalline particle or globular structures is the underpinning objective of this invention. This can be achieved without replacing fluorine from the surface layer of a hydroflurocarbon polymer at high temperatures or degrading the bulk of the hydroflurocarbon polymer by pyrolysis. Thus, this invention provides methods for obtaining desired surface effects of PVDF or equivalent materials, which will now be explained by several points and illustrated by various non-limitative embodiments.

First, PVDF possesses two valuable properties of practical importance, which are the polymorphic and piezoelectric properties. In regards to the polymorphic properties, PVDF is a border line hydrophobic (Table 1) semi-crystalline polymer that is approximately 50% amorphous; wherein the monomer's structure is [—$CH_2$—$CF_2$—], and the repeated chains occur mostly in a head to tail configuration. PVDF can be dissolved at low temperatures (e.g., <60° C.) in an organic solvent (as a primary solvent) such as N,N-dimethylacetamide (DMA), N,N-dimethylformamide (DMF), dimethylsulfoxide (DMSO), hexamethyl phosphoramide (HMPA), N-methyl-2-pyrrolidone (NMP), tetramethylurea (TMU), triethyl phosphate (TEP), trimethyl phosphate (TMP), acetone, methyl ethyl ketone (MEK), tetrahydrofuran (THF), and/or combinations thereof. This is unlike some hydroflurocarbon polymers such as PTFE (Teflon) or other hydrophobic plastic materials such as polyethylene (PE) and polypropylene (PP). Because of its solubility in such solvents, the fabrication of PVDF membranes via wet, rather than melt, phase inversion methods is possible. Since PVDF is insoluble in water, the repeatedly reported medium (e.g., as a secondary solvent) for fabricating PVDF via phase inversion is usually water with or without peroxy compounds (e.g., containing the divalent group O—O) acting as polymerization catalysts. In regards to the piezoelectric properties (e.g., transfer mechanical energy to electrical energy and vice versa), the high Curie point (103° C.; the temperature above which the piezoelectric effect breaks down), and the response to an electric potential by acting along the backbone make PVDF a valuable material. Other useful properties of PVDF include high elastic modulus and high rigidity (resists deformation); resistance to heat, combustion, ageing and abrasion; chemically inert and non toxic; and stability to radiation (X-ray, UV and Gamma).

Second, one of the utilities of the polymorphic properties of PVDF is to form membranes. Recalling that a raw polymer must be soluble in a primary solvent, and, in turn, the primary solvent must be soluble in a secondary solvent, whereas the polymer is insoluble in the secondary phase; thereby de-mixing the polymer, as it is forced out of the primary solvent by the secondary solvent, into a polymer-rich phase and a surrounding polymer-lean solution. However, the polymer-rich phase may be dominated by amorphous particles (precipitation), pure crystalline polymorph particles (crystallization), or a concurrent combination of precipitation and crystallization. The differences among them lie in the formation process and the final product formed. As is the nature of this type of phase inversion, the formation process (the thereby predominance of either one) requires a proper effective secondary solvent and a precise control over the conditions (e.g., the rate of induction-time as related to instant or delayed de-mixing, and the rate of mass transfer as related to the level of saturation and stability) under which the thermodynamic and kinetic phase behaviors of the forming membrane are dictated. In this invention, crystallization of PVDF or an equivalent material is sought out to form effective and inexpensive membranes.

Third, amine solvents [including methylamine (ME), ethylamine (EA), isopropylamine (IPA), propylamine (PA), dimethylamine (DMA), diethylamine (DEA), diisopropylamine (DIPA), dipropylamine (DPA), trimethylamine (TMA), triethylamine (TEA), tripropylamine (TPA)] are unexpectedly found to be effective in crystallizing PVDF or an equivalent material to form the sought out membranes and other articles. Such amine solvents are weak bases, which do not generate hydroxyl ions directly by dissociation, but by reaction with water. For example, IPA reacts with water as follows:

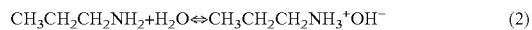 (2)

Yet, most weak bases are anions. For example, the fluoride ion is a weak base anion, which undergoes a similar reversible reaction with water as follows:

 (3)

In both cases of such weak bases, the forward reactions occur only to a slight extent to produce a weak acid (e.g., $CH_3CH_2CH_2NH_3^+$; HF); and an enough $OH^-$ ion to make the solution basic. Further, the reaction of the amine solvent (IPA for example) with hydrofluoric acid generates the amine solvent in an anionated form as follows:

 (4)

Here, the novelty of this invention resides with the use of an aqueous amine solvent as a weak base, thereby not as a strong denature, to pre-treat a solution of PVDF (or an equivalent material) dissolved in a primary solvent before phase inverting the solution; wherein the aqueous amine solvent gently draws some of the inorganic fluorine from the water-insoluble PVDF polymer for reaction, thereby generating the hydrofluoric acid by de-hydrofluorinating the PVDF; wherein implicit in this pre-treatment is the further reaction of the generated hydrofluoric acid with the aqueous amine solvent to regenerate the amine solvent in the anionated (fluorine) form; and wherein the amine solvent in the anionated form, as a weak anion base, represents a further step that draws in an essentially similar manner some of the fluorine from the water-insoluble PVDF polymer; thereby $OH^-$ ions are dissociated from the aqueous amine solvent, the released fluorine anion from PVDF and the amine solvent in the anionated form to diffuse in the PVDF polymer and bring it to reaction. The combined effects of the aqueous amine solvent and the amine solvent in the anionated form, which are not strong denaturants, minimize the disruption of inter-molecular interactions in PVDF (or an equivalent material), and leads to the formation of very fine crystalline clusters. The implication of this novelty of molecular interactions is that they serve as gentle re-crystallization media prior to phase inverting the PVDF solution.

Fourth, Table 2 presents the liquid surface tensions of water and the amine solvents. The liquid surface tensions ($\sigma_L$) of such amine solvents are not only much lower than $\sigma_L$ of water (Table 2), but also lower than the critical surface tension ($\sigma_C$) of PVDF (Table 1). Here, $\sigma_C$ is the surface tension at which a liquid just completely wets a surface ($\theta$=0). The ability of such an aqueous amine solvent to spread through the low energy PVDF solution depends on the volume fraction of the amine solvent in water to depress the surface tension of water ($\sigma_L$) in the aqueous amine solution ($\sigma_S$) preferably below $\sigma_C$ of PVDF. For example, $\sigma_L$ of $C_3H_9N$ [Table 2; (TMA: 13.4 mN/m; IPA: 17.5 mN/m)] is roughly about half $\sigma_C$ of PVDF [Table 1; (31.6 mN/m)]. FIG. 1 shows the surface tensions of the aqueous TMA solution as a function of volume fractions, and an essentially similar trend is exhibited by the aqueous IPA solution. Here, the volume fraction ($\varphi$) is defined as follows [Bader, 1999]:

$$\varphi_i = \left[ \frac{x_i v_i}{\sum_{i=1}^{2} x_i v_i} \right] \quad (5)$$

where $x_i$ is the mole fraction and $v_i$ is the pure solvent molar volume. A relatively small volume fraction of most of such amine solvents would thus reduce the interfacial tension of the aqueous amine solution to about or below $\sigma_C$ of PVDF. It follows from the definition of $\sigma_C$ and the insolubility of PVDF in pure water that the novelty of this invention further resides in sufficiently lowering the surface tension of water in the aqueous amine solution by the amine solvent; thereby largely delaying the instantaneous de-mixing (precipitation) power of pure water prior to phase inverting the PVDF solution.

Fifth, the pores in a hydrophobic membrane are filled with the fluid that wets the membrane. The non-wetting fluid (water) does not permeate into pores of the membrane as long as the pressure on the non-wetting fluid side is kept below a critical value, which is known as the "liquid entry" or "breakthrough" pressure. For gas-liquid contacting (e.g., vapor-water as in MD) or liquid-liquid extraction (e.g., de-mixing oil and water phases from wet-oil), the "liquid entry" pressure of water (the non-wetting fluid) may be roughly approximated as follows:

$$\Delta P_E = \frac{-2\sigma \cos\theta_w}{r} \quad (6)$$

where $\sigma$ may refer to as the surface tension in the case of vapor-liquid contacting or the interfacial tension in the case of liquid-liquid contacting, $\theta_w$ is the water contact angle of the membrane, and r is the pore radius of the membrane. Eq. (6) implies that the higher the water contact angle and the lower pore radius of the membrane, the higher is the liquid entry pressure of water. It follows from the definition of $\Delta P_E$ and the insolubility of PVDF in pure water that the novelty of this invention yet further resides in substantially increasing the water contact angle of the membrane by the aqueous amine solution and substantially decreasing the pore size of the membrane by limiting the water content in the aqueous amine solution prior to phase inverting the PVDF solution.

Figure 2A:
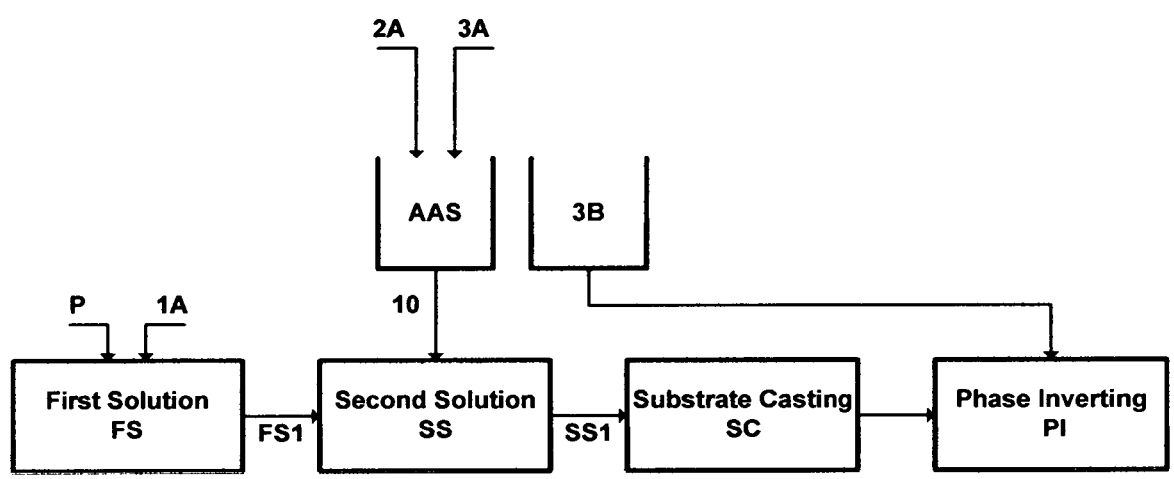
FIG. 2A illustrates the steps to prepare a material for casting a flat-sheet.

FIG. 2A depicts one embodiment of this invention, wherein an aqueous amine solution is utilized as a useful solvent in the polymer phase inversion method to form membranes in a flat-sheet configuration. As such, an amount of a polymer [P] is dissolved in an amount of a primary solvent [1A] to form a homogeneous first solution [FS]. An amount of an amine solvent [2A] is mixed with an amount of water [3A] to form an aqueous amine solution [AAS] to reduce $\sigma_S$ of the aqueous amine solution [AAS] to preferably about or below $\sigma_C$ of PVDF. An amount [10] of the aqueous amine solution [AAS], which now serves as a second solvent, is then mixed with an amount [FS1] of the first solution [FS] to control the crystal growth of the polymer [P] by conceiving near induction nuclei; thereby obtaining a readily tailored structural second solution [SS]. An amount of the second solution [SS1] is then casted on a substrate [SC], wherein this amount [SS1] controls the thinness of the casted second solution [SS] on the substrate. The casted substrate [SC] is phase inverted [PI] in a bath containing only water [3B] at a temperature preferably in the range of 5-25° C. The substrate containing the attached phase inverted membrane is removed from the bath; wherein the attached membrane is spontaneously veered away from the substrate as the flat sheet membrane, rinsed with water and dried by the atmospheric air (these latter steps are not shown in FIG. 2A).

The hydroflurocarbon polymer [P] is selected from the group consisting of polyvinylidene fluoride (PVDF), polytrifluoroethylene (PFE), polychlorotrifluoroethylene (PCFE), fluorinated ethylene propylene (FEP), polyhexafluoropropylene (PHFP), and/or combinations thereof.

The primary solvent to dissolve the polymer is selected from the group consisting of N-methyl-2-pyrrolidone (NMP), N,N-dimethylacetamide (DMA), N,N-dimethylformamide (DMF), dimethylsulfoxide (DMSO), hexamethyl phosphoramide (HMPA), tetramethylurea (TMU), triethyl phosphate (TEP), trimethyl phosphate (TMP), acetone, methyl ethyl ketone (MEK), tetrahydrofuran (THF), and/or combinations thereof.

The amine solvent to form the aqueous amine solution is selected from the group consisting of methylamine (ME), ethylamine (EA), isopropylamine (IPA), propylamine (PA), dimethylamine (DMA), diethylamine (DEA), diisopropylamine (DTPA), dipropylamine (DPA), trimethylamine (TMA), triethylamine (TEA), tripropylamine (TPA), and/or combinations thereof.

Figure 2B:
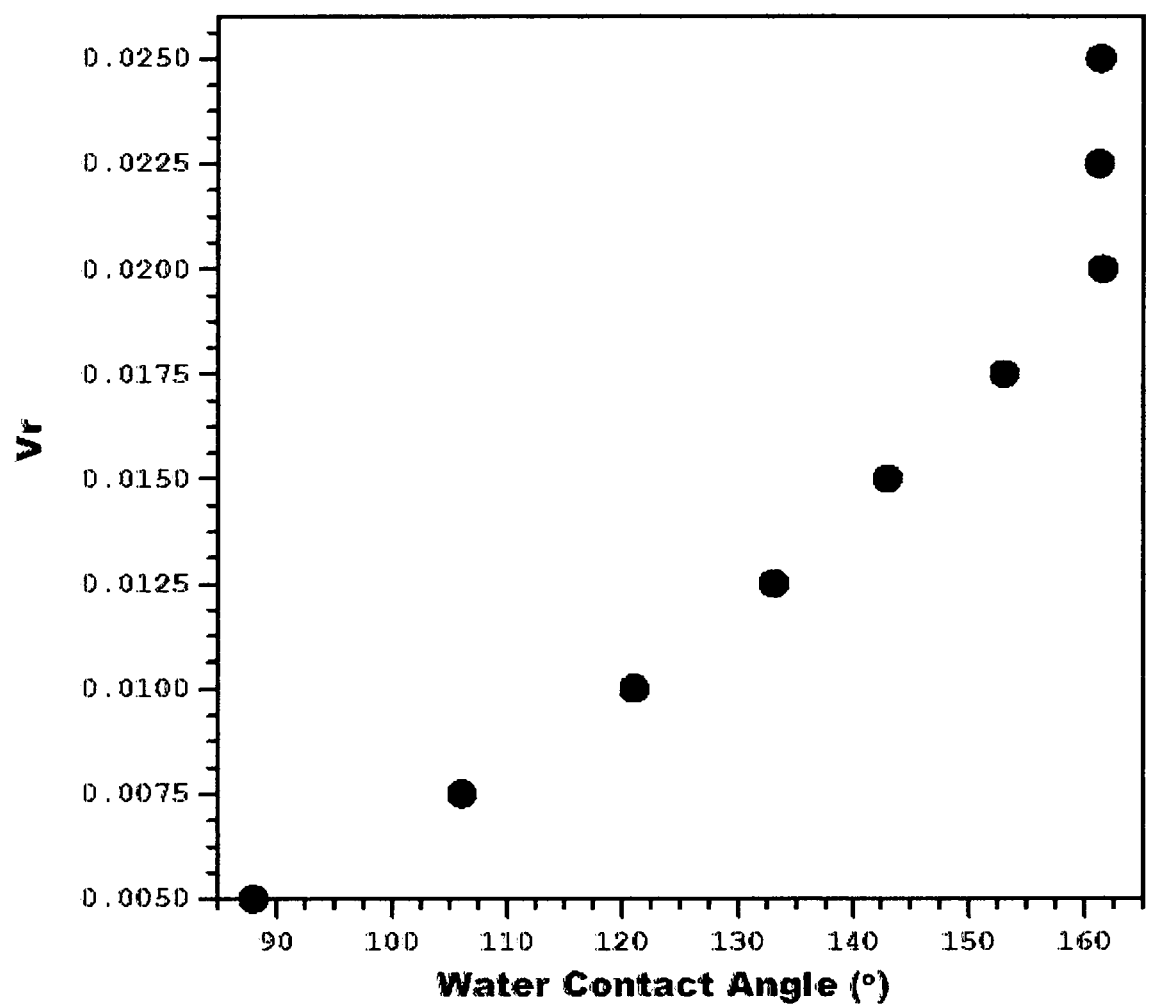
FIG. 2B illustrates the effect an aqueous amine solution on changing water contact angles of a membrane.

Thus, successful flat-sheet membranes were made according to this invention in a multitude of variants. For example, in one variant, a PVDF powder (as a polymer [P]) and NMP (as a primary solvent [1A]) were mixed to form a homogenous first solution [FS] (3 vol % [P]: 97 vol % [1A]). IPA [2A] and water [3A] were mixed to form an aqueous amine solution [AAS]; wherein φ of IPA in water was about 0.23 (about 6 mol %), which corresponded to about 31.1 mN/m of $\sigma_L$ the aqueous amine solution. Different amounts [10] of the aqueous amine solution [AAS] were then mixed with fixed amounts [FS1] of the first solution [FS] to form several second solutions [SS]. Each of the second solutions was casted on an inert substrate, each of the casted substrate was immersed in a bath containing only water for phase inversion, and each of the formed flat-sheet membranes is removed from each substrate and washed with water. FIG. 2B shows the water contact angle for each of the flat-sheet membrane as a function of the volume ratio ($V_r = V_1/V_{FS1}$), where the latter is the volume of the aqueous amine solution ($V_1$) to the volume of the first solution ($V_{FS1}$). The water contact angle ($\theta_w$) increased (88-161.5°) with increasing $V_r$, wherein a plateau is reached at higher $V_r$ values. The oil contact angle ($\theta_o$) practically approached zero; thereby oil would wet the membrane and spread freely over the membrane surface at a rate depending on the viscosity of oil and the roughness of the membrane surface. The cross-section and surface morphology of the membrane, as observed by scanning electron microscopy, revealed that the membrane surface is skinless, rough and with a structure comprising packed interconnected spherulitic particles. The structural ratio of fluorine to carbon in the original PVDF is reduced by roughly 17% in the PVDF membranes upon the addition of the aqueous amine solutions ($V_r = 0.02$); which indicated that: (1) the chemical modification of PVDF by the aqueous amine solution took place, as essentially described in Paragraphs [0029] and [0030], thereby chemically de-hydrofluorinating the PVDF at essentially ambient temperature, instead of thermally at high temperatures, and in an essentially equivalent manner as given in Eq. (1B); and (2) the exhibited $\theta_w$ plateau at higher $V_r$ values (>0.02) revealed that the de-hydrofluorination of PVDF reached levels that would be structurally detrimental (e.g., lower the mechanical strength) to an unsupported thin flat-sheet membrane. The crystalline structure of the membranes, as observed by X-ray diffraction, revealed that the degree of crystallinity increased with increasing $V_r$ with patterns corresponded to the β crystalline phase of PVDF. This is consistent with the phase inversion approach in this invention since the β crystalline phase formed from wet PVDF, which it has actually more intermolecular stability. The structure of β phase forces the fluorine atoms along the carbon backbone to come closer together, which allows tighter packing density and reduces the intermolecular strain, thereby allowing greater chain interconnectivity and more dipolar alignment giving the PVDF membrane its strong piezoelectric properties. Such very desirable properties would come into play in applying an electrical field to the PVDF membrane (if needed). However, a suitable membrane for MD to separate water vapor from a saline stream should exhibit high vapor permeability, which may be obtained by making the pore size of the membrane relatively larger.

When chlorine is introduced into water; as chlorine gas ($Cl_2$), hypochlorite ($ClO^-$) in the form of sodium or calcium, or in other forms, it rapidly undergoes hydrolysis to produce mainly hypochlorous acid (HClO); wherein the latter is a weak acid that dissociates in aqueous solution as follows:

$$HClO + H_2O \Leftrightarrow ClO^- + H^+ + H_2O \quad (7)$$

If an amine solvent (IPA for example) is reacted with hypochlorous acid, it will generate the amine solvent in a monochloroamine form as follows:

$$CH_3CH_2CH_2NH_2 + HClO \rightarrow CH_3CH_2CH_2NHCl + H_2O \quad (8)$$

If the source of chlorine is chlorine gas, the hydrolysis of the chlorine gas will also produce hydrochloric acid in addition to the dominant hypochlorous acid. The amine solvent (IPA for example) also reacts with hydrochloric acid to regenerate the amine solvent in an anionated form as follows:

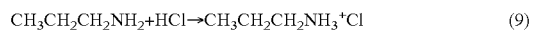
$$CH_3CH_2CH_2NH_2 + HCl \rightarrow CH_3CH_2CH_2NH_3^+Cl \quad (9)$$

In addition to utility of an aqueous amine solution as described in Paragraphs [0029] and [0030], the novelty of this invention further resides with the use of a chlorinated aqueous amine solvent (e.g., $CH_3CH_2CH_2NHCl$) to serve as a pore enlarger; thereby enhancing the vapor permeability of PVDF or an equivalent material.

Figure 2C:
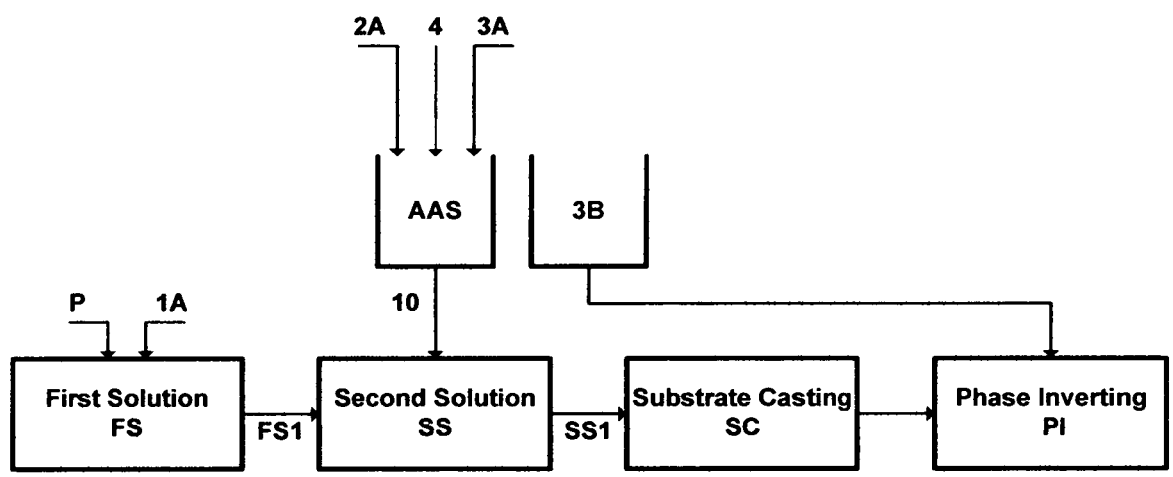
FIG. 2C illustrates another set of steps to prepare a material for casting a flat-sheet.

FIG. 2C depicts another embodiment of this invention, wherein a chlorinated aqueous amine solution is utilized as a useful solvent in the polymer phase inversion method to form membranes in a flat-sheet configuration. The processing steps as shown in FIG. 2C differ from the processing steps as shown in FIG. 2A in that: (1) an amount of an amine solvent [2A], an amount of water [3A], and an amount of a chlorine source [4] are mixed together to form the chlorinated aqueous amine solution [AAS]; and (2) an amount [10] of the chlorinated aqueous amine solution [AAS] is mixed with an amount [FS1] of the first solution [FS] to form the second solution [SS].

The chlorine source is selected from the group consisting of chlorine gas, hypochlorite, and/or combinations thereof.

A flat-sheet configuration is very useful in different applications including, for example, replacing conventional coalescing packings of a 3-phase separator in an oil gathering center by the invented flat-sheets in submerged membrane modules to effectively directly simultaneously separate gas and oil from water within the 3-phase separator, wastewater membrane bioreactors, among other applications. A solid-fiber configuration utilizing the piezoelectric property of PVDF is very useful in different applications including, for example, energy harvesters (e.g., solar panels), mechanical actuators, strain sensors, artificial muscles, and nearly completely non-porous membranes for higher pressure applications. A hollow-fiber configuration is also very useful in, for example, a gas-liquid or a liquid-liquid contactor especially for standalone membrane applications. However, the three essential formation differences among these configurations are morphology, viscosity, and tension/stress. For a flat-sheet configuration or a solid-fiber configuration, morphology adjustments start naturally from the outer surface of a cast or extrude film after immersing in a phase inverting bath. For a hollow-fiber configuration, morphology adjustments are simultaneously required for the inner (lumen side) and the outer (shell side) surfaces, wherein the inner surface is controlled by a bore fluid (e.g., liquid or gas) as an internally phase inverting media, and wherein the outer surface is controlled by a solvent in an externally phase inverting bath. The required viscosity for a polymer solution (a dissolved polymer in a primary solvent) for spinning a solid-fiber or a hollow-fiber may be an order of magnitude higher than that for casting a flat-sheet; thereby the required amount of the polymer for the solid-fiber or the hollow-fiber may be in the order of 3-times the required amount for the flat-sheet. Unlike the formation of the flat-sheet, the solid-fiber or the hollow-fiber is usually formed under tension and/or stress.

Figure 3A:
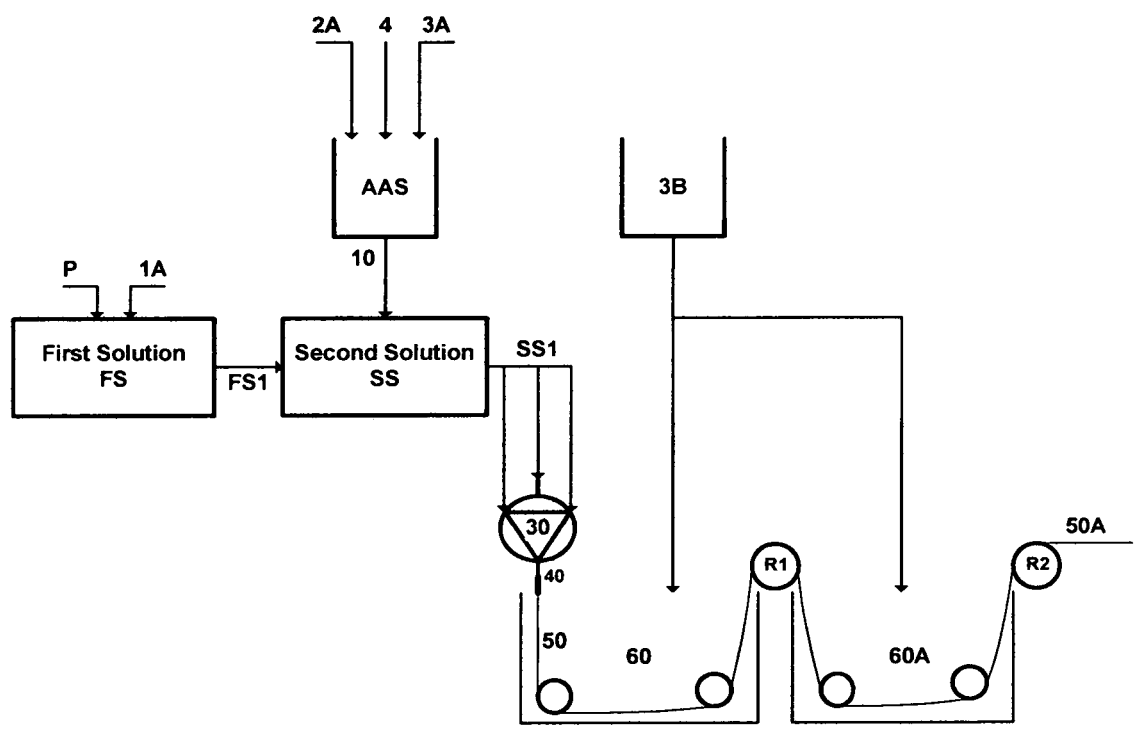
FIG. 3A illustrates the steps to prepare a material for extruding a solid-fiber.

FIG. 3A depicts a further embodiment of this invention, wherein a chlorinated aqueous amine solution is utilized as a useful solvent in the polymer phase inversion method to form membranes in a solid-fiber configuration. An amount of a polymer [P] is dissolved in an amount of a primary solvent [1A] to form a homogeneous first solution [FS]. An amount of an amine solvent [2A], an amount of water [3A], and an amount of a chlorine source [4] are mixed together to form the chlorinated aqueous amine solution [AAS]. An amount [10] of the chlorinated aqueous amine solution [AAS] is mixed with an amount [FS1] of the first solution [FS] to form a second solution [SS]. An amount [SS1] of the second solution [SS] is extruded through a spinneret [30]. At the exit of the spinneret, conceived fibers [50] may pass through an air gap [40] before entering a first spinning bath [60] containing only water [3B] for phase inverting at a temperature preferably in the range of 5-25° C. After the first spinning bath [60], the pre-solidified solid-fiber is wound to the first roller [R1], and then it is exposed to a second bath [60A] containing also only water for washing and a further solidification, wherein a second drafting occurs between the first roller [R1] and a second roller [R2]. The second drawing mostly solidifies the solid-fiber, and if needed, freeze drying or hot air drafting may be applied (not shown in FIG. 3A) to the spun solid-fiber [50A] prior to winding.

Figure 3B:
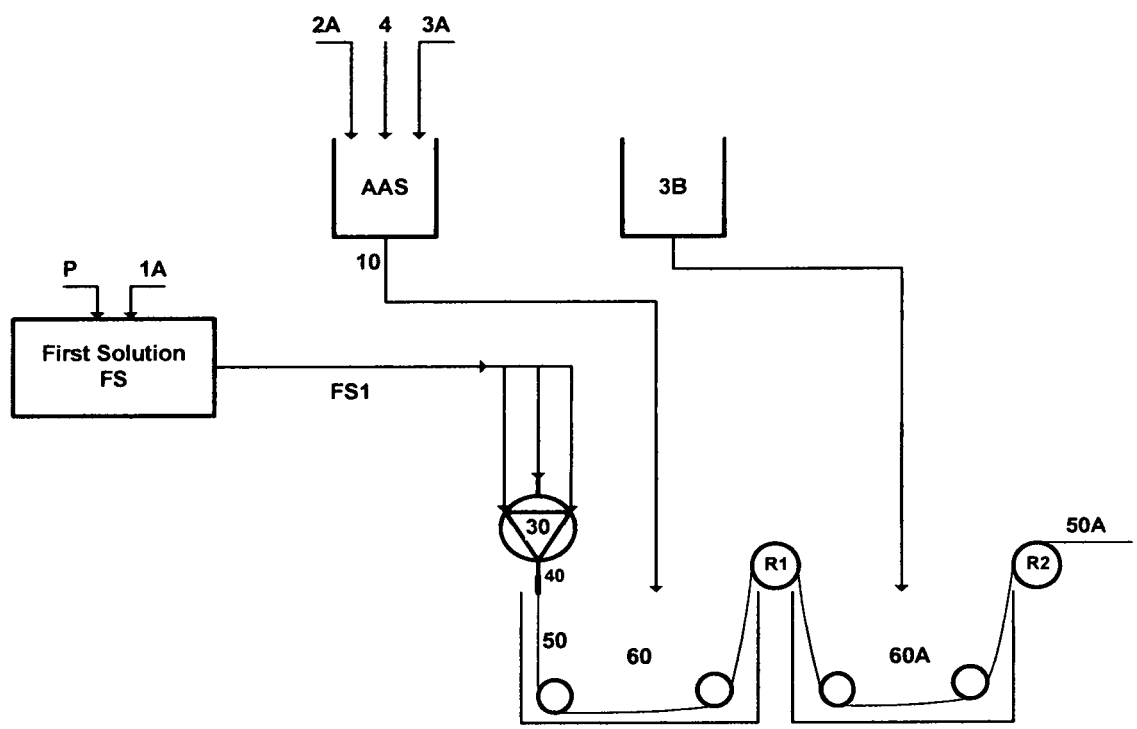
FIG. 3B illustrates another set of steps to prepare a material for extruding a solid-fiber.

FIG. 3B depicts yet a further embodiment of this invention, wherein a chlorinated aqueous amine solution is utilized as a useful solvent in the polymer phase inversion method to form membranes in a solid-fiber configuration; which differs from FIG. 3A in that: (1) an amount [FS1] of the first solution [FS] is extruded through the spinneret [30]; and (2) an amount [10] of the chlorinated aqueous amine solution [AAS], instead of only water, is used in the first spinning bath [60], before phase inverting the extruded solid-fiber in the second bath [60A] that contains only water to form the solid-fiber.

Figure 4A:
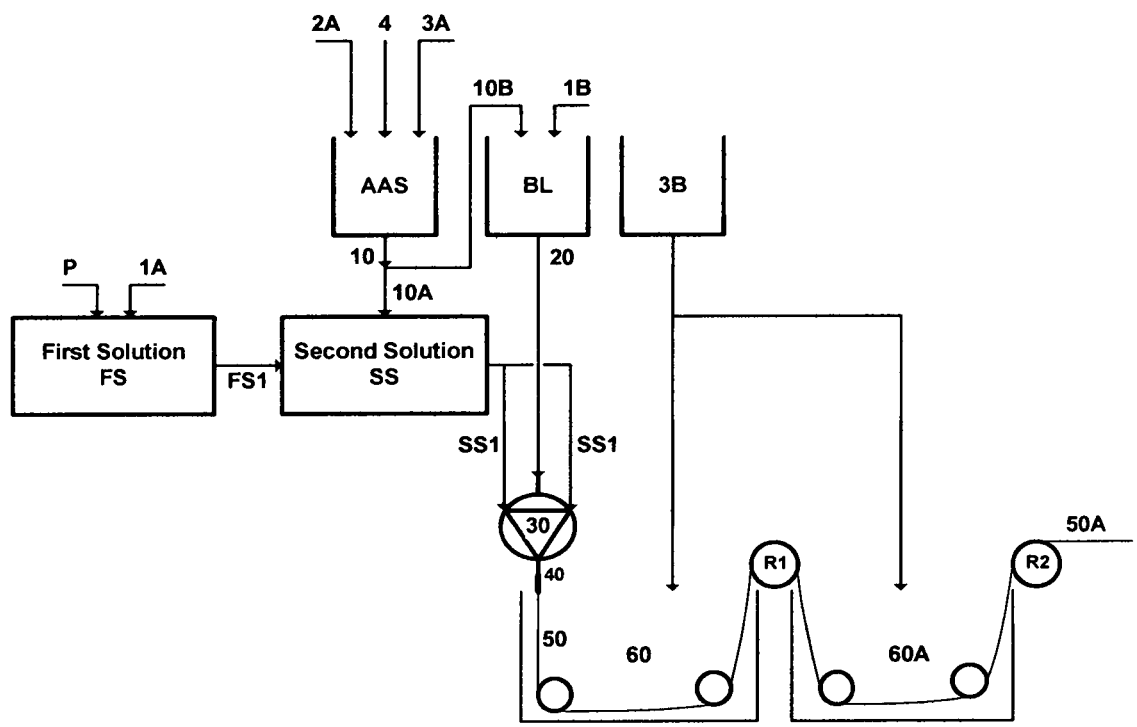
FIG. 4A illustrates the steps to prepare a material for extruding a hollow-fiber.

FIG. 4A depicts yet a further embodiment of this invention, wherein a chlorinated aqueous amine solution is utilized as a useful solvent in the polymer phase inversion method to form membranes in a hollow-fiber configuration. An amount of a polymer [P] is dissolved in a first amount of a primary solvent [1A] to form a homogeneous first solution [FS]. An amount of an amine solvent [2A], an amount of water [3A], and an amount of a chlorine source [4] are mixed together to form the chlorinated aqueous amine solution [AAS]. A first amount [10A] of the chlorinated aqueous amine solution [AAS] is mixed with an amount [FS1] of the first solution [FS] to form a second solution [SS], which serves as an external coagulant to control the morphology of the outer surface of the hollow fiber. A second amount [10B] of the chlorinated aqueous amine solution [AAS] is mixed with a second amount of the primary solvent [1B] to form a bore liquid [BL], which serves as an internal coagulant to reduce the resistance and control the morphology of the inner surface of a hollow fiber. An amount [SS1] of the second solution [SS] and an amount [20] of the bore liquid [BL] are extruded through a spinneret [30]. At the exit of the spinneret, conceived fibers [50] pass through an air gap [40] before entering a first spinning bath [60] containing only water [3B] for phase inverting at a temperature preferably in the range of 5-25° C. After the first spinning bath [60], the pre-solidified hollow-fiber is wound to the first roller [R1], and then it is exposed to a second bath [60A] containing also only water for washing and a further solidification, wherein a second drafting occurs between the first roller [R1] and a second roller [R2]. The second drawing mostly solidifies the hollow fiber, and if needed, freeze drying or hot air drafting may be applied (not shown in FIG. 4A) to the spun hollow-fiber [50A] prior to winding.

Figure 4B:
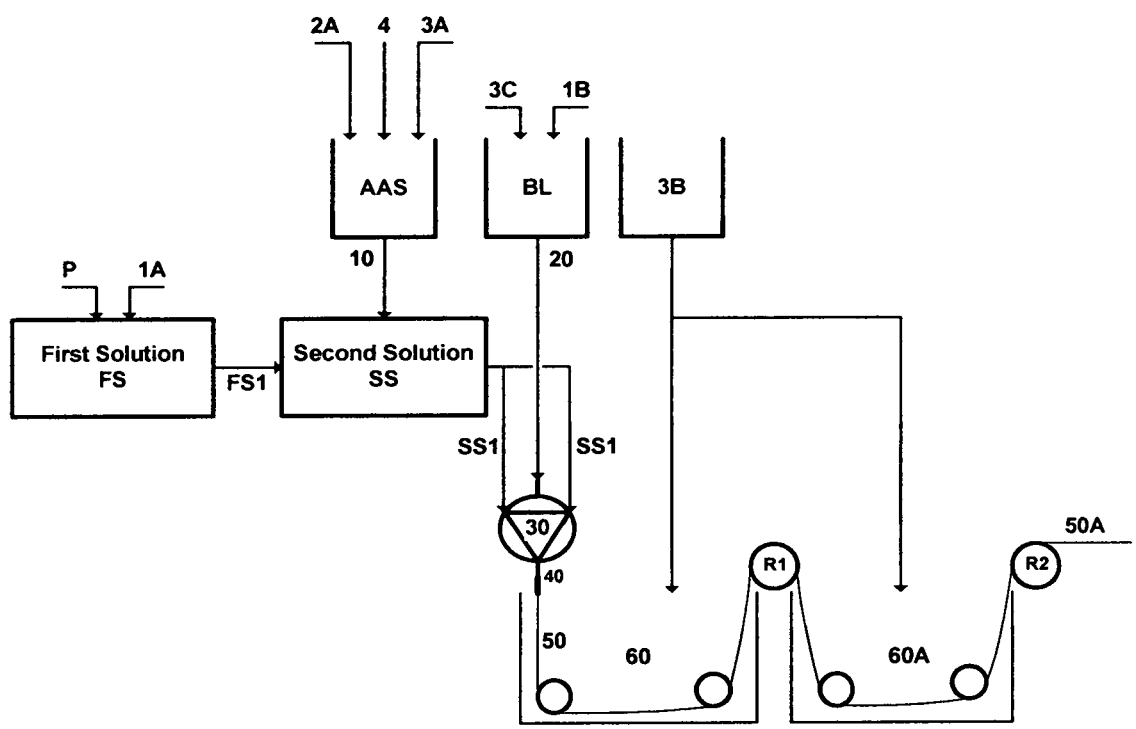
FIG. 4B illustrates another set of steps to prepare a material for extruding a hollow-fiber.

FIG. 4B depicts yet a further embodiment of this invention, wherein a chlorinated aqueous amine solution is utilized as a useful solvent in the polymer phase inversion method to form membranes in a hollow-fiber configuration; which differs from FIG. 4A in that the second amount of the primary solvent [1B] is mixed with an amount of water [3C], instead of the second amount of the chlorinated aqueous amine solution [10B], to form the bore liquid [BL].

Figure 4C:
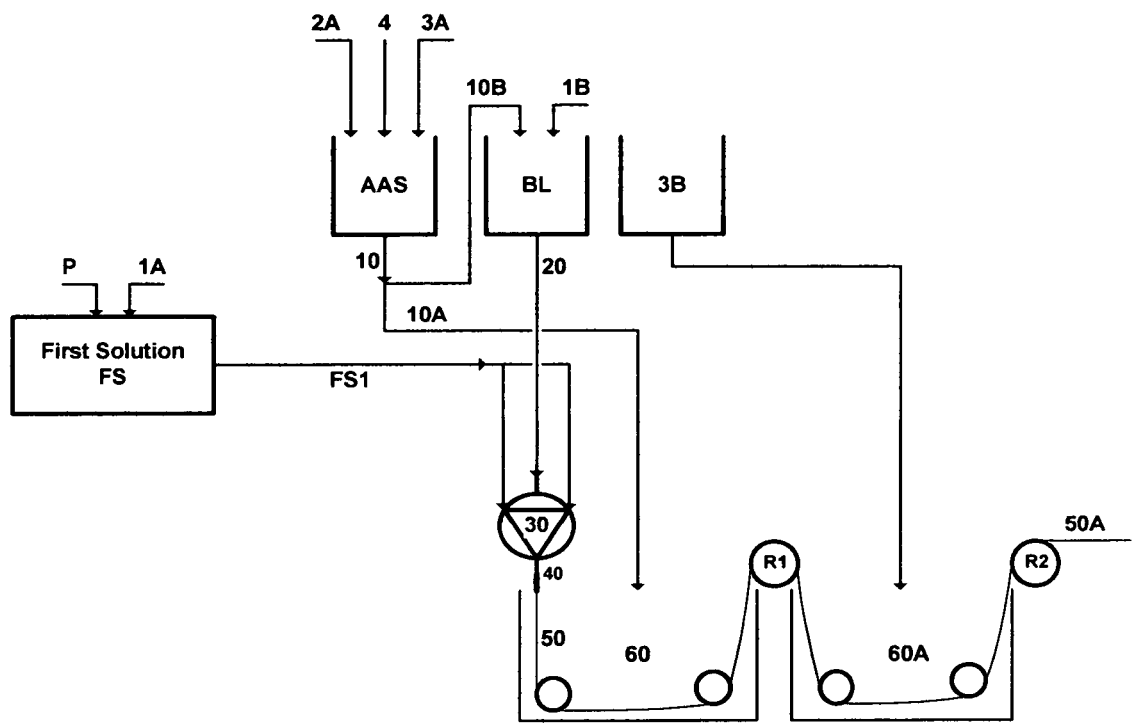
FIG. 4C illustrates a further set of steps to prepare a material for extruding a hollow-fiber.

FIG. 4C depicts yet a further embodiment of this invention, wherein a chlorinated aqueous amine solution is utilized as a useful solvent in the polymer phase inversion method to form membranes in a hollow-fiber configuration; which differs from FIG. 4A in that: (1) an amount [FS1] of the first solution [FS] and an amount [20] of the bore liquid [BL] are extruded through the spinneret [30]; and (2) the first amount [10A] of the chlorinated aqueous amine solution [AAS] is used, instead of only water, in the first spinning bath [60], before phase inverting the extruded hollow-fiber in the second bath [60A] that contains only water to form the hollow-fiber membrane.

Figure 4D:
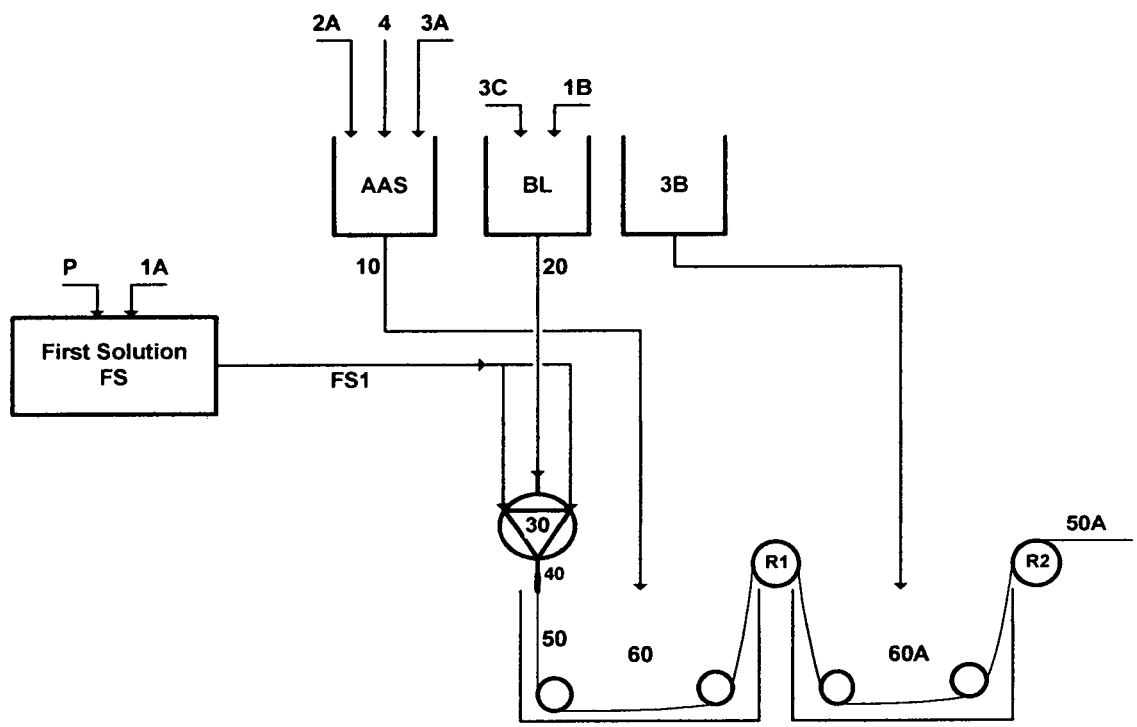
FIG. 4D illustrates yet a further set of steps to prepare a material for extruding a hollow-fiber.

FIG. 4D depicts yet a further embodiment of this invention, wherein a chlorinated aqueous amine solution is utilized as a useful solvent in the polymer phase inversion method to form membranes in a hollow-fiber configuration; which differs from FIG. 4A in that: (1) the second amount of the primary solvent [1B] is mixed with the amount of water [3C], instead of the second amount of the chlorinated aqueous amine solution [10B], to form the bore liquid [BL]; (2) an amount [FS1] of the first solution [FS] and an amount [20] of the bore liquid [BL] are extruded through the spinneret [30]; and (3) an amount [10] of the chlorinated aqueous amine solution [AAS] is used, instead of only water, in the first spinning bath [60], before phase inverting the extruded hollow-fiber in the second bath [60A] that contains only water to form the hollow-fiber membrane.

The above described inventive methods of utilizing an aqueous amine solution or a chlorinated aqueous amine solution are aimed at semi-crystalline polymers; wherein fine crystal clusters are selectively and relatively slowly formed from a polymer dissolved in a primary solvent by such amine solutions resulting in crystalline polymorph structures. Generated hydrophilic membranes by phase inverting glassy polymers (e.g., polysulfone, cellulose acetate, regenerated cellulose, nitrocellulose, polyamide, polyimide, etc.) usually involved very rapid precipitation resulting in amorphous macro-void structures. However, the utilization of an aqueous amine solution or a chlorinated aqueous amine solution as described in this invention can be extended to such glassy polymers to form membranes with the structures free of such undesirable macro-voids.

TABLE 1

Critical Surface Tensions ($\sigma_c$) and Water Contact Angles ($\theta_w$).

| Material | $\sigma_c$ (mN/m) | $\theta_w$ (°) |
| --- | --- | --- |
| Polyvinylidene fluoride (PVDF) | 31.6 | 89 |
| Polytrifluoroethylene (PFE) | 26.5 | 92 |
| Polychlorotrifluoroethylene (PCFE) | 30.8 | 99.3 |

TABLE 1-continued

Critical Surface Tensions ($\sigma_c$) and Water Contact Angles ($\theta_w$).

| Material | $\sigma_c$ (mN/m) | $\theta_w$ (°) |
|---|---|---|
| Fluorinated ethylene propylene (FEP) | 19.1 | 108.5 |
| Polytetrafluoroethylene (PTFE) | 19.4 | 112 |
| Polyhexafluoropropylene (PHFP) | 16.9 | 112 |

TABLE 2

Selected Properties of Solvents.

| Solvent | $\sigma_L$ (mN/m) | MV (Å$^3$) | BP (° C.) | VP (mmHg) | $\rho$ (g/cm$^3$) | $\mu$ (cp) |
|---|---|---|---|---|---|---|
| Water (H$_2$O) | 71.9 | 30.0 | 100.0 | 23.6 | 0.998 | 0.76 |
| MA (CH$_5$N) | 19.2 | 73.4 | −6.4 | 2,680.1 | 0.703 | 0.19 |
| DMA (C$_2$H$_7$N) | 26.3 | 114.1 | 6.9 | 1,475.3 | 0.656 | 0.21 |
| TMA (C$_3$H$_9$N) | 13.4 | 155.1 | 3.0 | 1,699.2 | 0.633 | 0.32 |
| EA (C$_2$H$_7$N) | 19.1 | 109.6 | 16.6 | 1,062.2 | 0.683 | 0.24 |
| DEA (C$_4$H$_{11}$N) | 19.9 | 171.8 | 55.5 | 235.7 | 0.707 | 0.33 |
| TEA (C$_6$H$_{15}$N) | 20.2 | 230.8 | 89.6 | 67.7 | 0.728 | 0.34 |
| IPA (C$_3$H$_9$N) | 17.5 | 142.7 | 32.4 | 575.1 | 0.688 | 0.36 |
| PA (C$_3$H$_9$N) | 21.8 | 136.9 | 48.7 | 313.5 | 0.717 | 0.34 |
| DIPA (C$_6$H$_{15}$N) | 19.1 | 234.4 | 83.5 | 79.4 | 0.717 | 0.40 |
| DPA (C$_6$H$_{15}$N) | 22.3 | 227.7 | 109.3 | 24.1 | 0.738 | 0.50 |
| TPA (C$_9$H$_{21}$N) | 22.4 | 178.4 | 158.0 | 1.5 | 0.753 | |

$\sigma_L$: Surface Tension at 25° C.; MV: Molecular Volume; BP: Boiling Point; VP: Vapor Pressure at 25° C.; $\rho$: Density at 25° C. (g/cm$^3$); and $\mu$: Viscosity at 25° C. (cp).

What is claimed is:

1. A method of preparing a purification membrane by casting a flat-sheet, said method comprising the steps of: (a) dissolving an amount of a polymer in an amount of a primary solvent to form a first solution; (b) mixing an amount of an amine solvent, an amount of water, and an amount of a chlorine source to form a chlorinated aqueous amine solution; (c) mixing an amount of said first solution with an amount of said chlorinated aqueous amine solution to form a second solution; thereby inducing selective fine crystal clusters of said polymer, without rapidly precipitating said polymer, and without degrading the bulk of the structure of said polymer; (d) casting an amount of said second solution on a substrate; and (e) phase inverting said substrate in a bath containing only water to form said flat-sheet.

2. The method of claim 1, wherein said polymer is selected from the group consisting of polyvinylidene fluoride, polytrifluoroethylene, polychlorotrifluoroethylene, fluorinated ethylene propylene, polyhexafluoropropylene, and combinations thereof.

3. The method of claim 1, wherein said primary solvent is selected from the group consisting of N-methyl-2-pyrrolidone, N,N-dimethylacetamide, N,N-dimethylformamide, dimethylsulfoxide, hexamethyl phosphoramide, tetramethylurea, triethyl phosphate, trimethyl phosphate, acetone, methyl ethyl ketone, tetrahydrofuran, and combinations thereof.

4. The method of claim 1, wherein said amine solvent is selected from the group consisting of methylamine, ethylamine, isopropylamine, propylamine, dimethylamine, diethylamine, diisopropylamine, dipropylamine, trimethylamine, triethylamine, tripropylamine, and combinations thereof.

5. The method of claim 1, wherein said chlorine source is selected from the group consisting of chlorine gas, hypochlorite, and combinations thereof.

6. A method of preparing a purification membrane by extruding a solid-sheet, said method comprising the steps of: (a) dissolving an amount of a polymer in an amount of a primary solvent to form a first solution; (b) mixing an amount of an amine solvent, an amount of water, and an amount of a chlorine source to form a chlorinated aqueous amine solution; (c) mixing an amount of said first solution with an amount of said chlorinated aqueous amine solution to form a second solution; thereby inducing selective fine crystal clusters of said polymer, without rapidly precipitating said polymer, and without degrading the bulk of the structure of said polymer; (d) extruding an amount of said second solution through a spinneret to produce an extruded solid fiber; and (e) phase inverting said extruded solid fiber in at least a bath containing only water to form said solid-sheet.

7. The method of claim 6, further comprising replacing the steps (c) through (e) by the following steps: extruding an amount of said first solution through said spinneret to produce said extruded fiber; subjecting said extruded fiber to a bath containing an amount of said chlorinated aqueous amine solution; and thereafter phase inverting said extruded solid fiber in said bath containing said only water to form said solid-sheet.

8. The method of claim 6, wherein said polymer is selected from the group consisting of polyvinylidene fluoride, polytrifluoroethylene, polychlorotrifluoroethylene, fluorinated ethylene propylene, polyhexafluoropropylene, and combinations thereof.

9. The method of claim 6, wherein said primary solvent is selected from the group consisting of N-methyl-2-pyrrolidone, N,N-dimethylacetamide, N,N-dimethylformamide, dimethylsulfoxide, hexamethyl phosphoramide, tetramethylurea, triethyl phosphate, trimethyl phosphate, acetone, methyl ethyl ketone, tetrahydrofuran, and combinations thereof.

10. The method of claim 6, wherein said amine solvent is selected from the group consisting of methylamine, ethylamine, isopropylamine, propylamine, dimethylamine, diethylamine, diisopropylamine, dipropylamine, trimethylamine, triethylamine, tripropylamine, and combinations thereof.

11. The method of claim 6, wherein said chlorine source is selected from the group consisting of chlorine gas, hypochlorite, and combinations thereof.

12. A method of preparing a purification membrane by extruding a hollow fiber, said method comprising the steps of: (a) dissolving an amount of a polymer in a first amount of a primary solvent to form a first solution; (b) mixing an amount of an amine solvent, an amount of water, and an amount of a chlorine source to form a chlorinated aqueous amine solution; (c) mixing an amount of said first solution with a first amount of said chlorinated aqueous amine solution to form a second solution; thereby controlling the morphology of the outer surface of said hollow fiber; (d) mixing a second amount of said primary solvent with a second amount of said chlorinated aqueous amine solution to form a bore liquid; thereby controlling the morphology of the inner surface of said hollow fiber; (e) extruding an amount of said second solution and an amount of said bore liquid through a spinneret to produce an extruded hollow-fiber; and (f) phase inverting said extruded hollow-fiber in at least a bath containing only water to form said hallow-fiber.

13. The method of claim 12, further comprising replacing step (d) by: mixing said second amount of said primary solvent with an amount of water to form said bore liquid.

14. The method of claim 12, further comprising replacing steps (c), (e) and (f) by the following steps: extruding an amount of said first solution and an amount of said bore liquid through said spinneret to produce said extruded hollow-fiber; subjecting said extruded hollow-fiber to a bath containing an amount of said chlorinated aqueous amine solution; and thereafter phase inverting said extruded hollow-fiber in said bath containing only water to form said hollow-fiber.

15. The method of claim 12, further comprising replacing steps (c) through (f) by the following steps: mixing said second amount of said primary solvent with an amount of water to form said bore liquid; extruding an amount of said first solution and an amount of said bore liquid through said spinneret to produce said extruded hollow-fiber; subjecting said extruded hollow-fiber to a bath containing an amount of said chlorinated aqueous amine solution; and thereafter phase inverting said extruded hollow-fiber in said bath containing only water to form said hollow-fiber.

16. The method of claim 12, wherein said polymer is selected from the group consisting of polyvinylidene fluoride, polytrifluoroethylene, polychlorotrifluoroethylene, fluorinated ethylene propylene, polyhexafluoropropylene, and combinations thereof.

17. The method of claim 12, wherein said primary solvent is selected from the group consisting of N-methyl-2-pyrrolidone, N,N-dimethylacetamide, N,N-dimethylformamide, dimethylsulfoxide, hexamethyl phosphoramide, tetramethylurea, triethyl phosphate, trimethyl phosphate, acetone, methyl ethyl ketone, tetrahydrofuran, and combinations thereof.

18. The method of claim 12, wherein said amine solvent is selected from the group consisting of methylamine, ethylamine, isopropylamine, propylamine, dimethylamine, diethylamine, diisopropylamine, dipropylamine, trimethylamine, triethylamine, tripropylamine, and combinations thereof.

19. The method of claim 12, wherein said chlorine source is selected from the group consisting of chlorine gas, hypochlorite, and combinations thereof.

* * * * *